March 31, 1953 R. BIDARD ET AL 2,633,479
SEPARATOR FOR ELECTRIC ACCUMULATORS
Filed Feb. 8, 1949 3 Sheets-Sheet 1
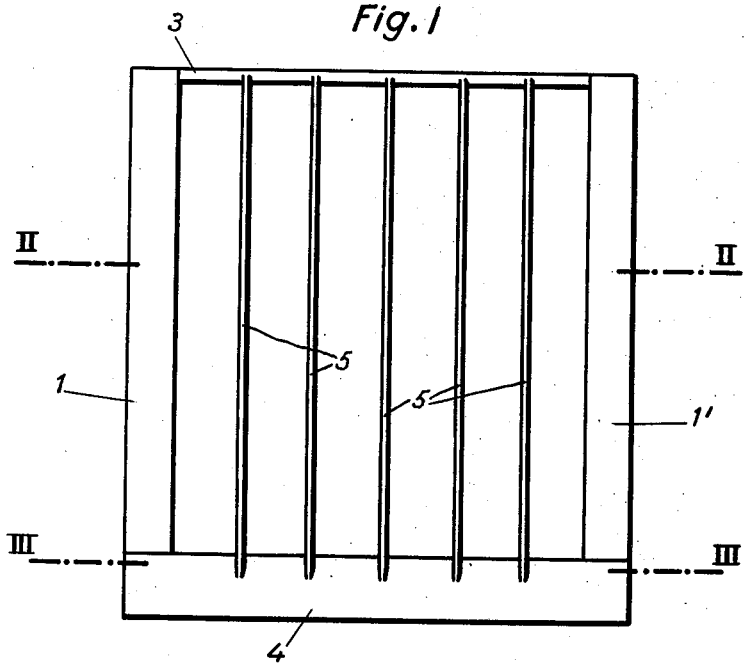
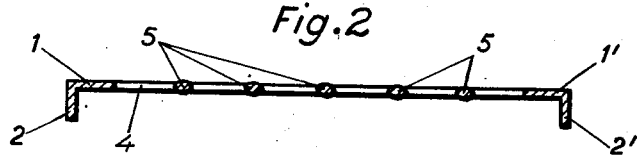
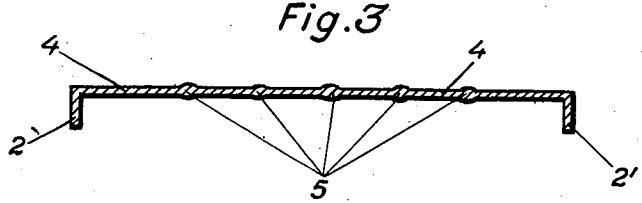
INVENTORS
ROBERT BIDARD
GEORGES PRÉMILLIEU
By Richardson and David
Attys

INVENTORS
ROBERT BIDARD
GEORGES PRÉMILLIEU

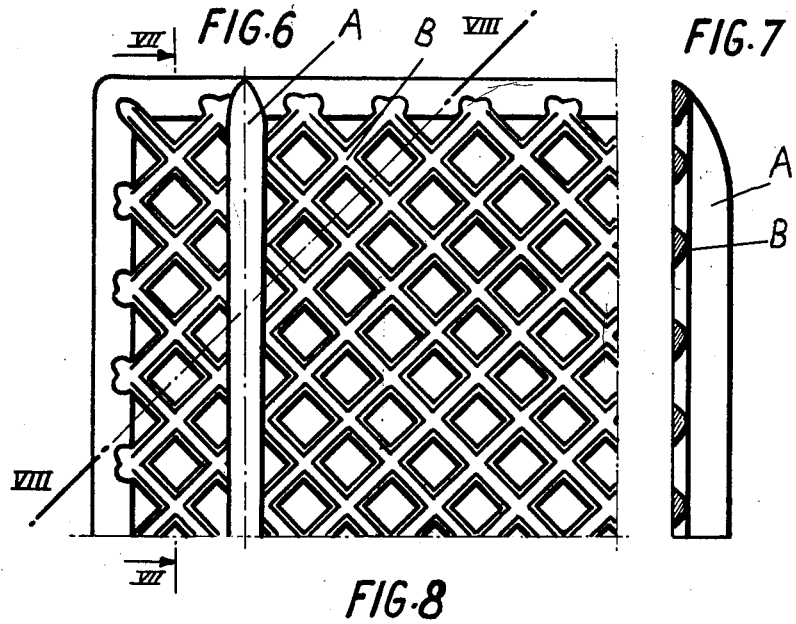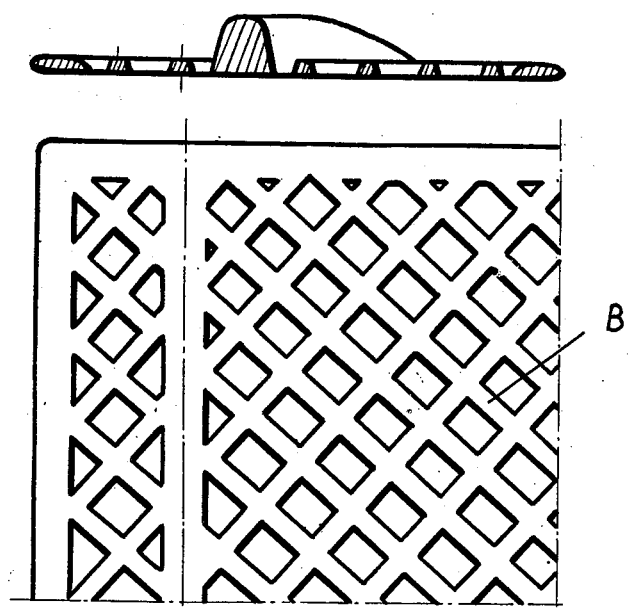

Patented Mar. 31, 1953

2,633,479

UNITED STATES PATENT OFFICE 2,633,479

SEPARATOR FOR ELECTRIC ACCUMULATORS

Robert Bidard and Georges Prémillieu, Cormeilles-en-Parisis, France

Application February 8, 1949, Serial No. 75,122
In France October 26, 1948

4 Claims. (Cl. 136—145)

This invention relates to separators for electric accumulators.

The object of the invention is to provide an improved separator which will ensure the insulation of the plates in lead or nickel electric accumulators.

An embodiment of the invention will now be described by way of example with reference to the accompanying drawings in which:

Fig. 1 is a side view of a separator.

Fig. 2 is a section on the line II—II of Fig. 1.

Fig. 3 is a section on the line III—III of Fig. 1.

Fig. 6 is an enlarged fragmentary side view of the separator according to Fig. 4.

Fig. 7 is a sectional view on the line VII—VII of Fig. 6.

Fig. 8 is a sectional view on the line VIII—VIII of Fig. 7.

Fig. 9 is a view of the rear face of Fig. 6.

In Figs. 1 to 3, a separator has a separating network constituted by a plurality of thin rods of round or ovoid cross-section arranged in parallel in a light frame formed with lateral enclosing flanges, the whole being manufactured in a single piece from a body of plastic injected under pressure, the plastic being polystyrene, vinyl chloride or one of their equivalents. The separator is constituted essentially by a frame whereof the dimensions correspond to the dimensions of the type of battery to be equipped. In the example given, it comprises two flat frame members $1$, $1^1$ having respectively L-flanges $2$, $2^1$ adapted to enclose the vertical edges of the corresponding accumulator plate to prevent all risk of short-circuit by the edges. At their upper ends the frame members $1$ and $1^1$ are interconnected by a frame member $3$ which is narrower than and of the same thickness as the frame members $1$ and $1^1$. At their lower ends the frame members $1$ and $1^1$ are interconnected by a frame member $4$ of the same thickness as, but somewhat wider than, the frame member $3$.

The members $3$ and $4$ serve to carry a series of rods $5$, $5^1$ etc. which are of round or ovoid cross-section, are very thin, and vary in number in accordance with the type of battery; in the present example they are five in number; in the existing state of the art, a standard model would have seven. These rods $5$ terminate in fillets joining them to the end strips $3$ and $4$. Their rounded cross-section is slightly larger than the thickness of the frame so as to extend beyond the latter (see Figs. 2 and 3) and solely engage the two plates which they must hold clear of one another. The rounded profile of their cross-section reduces the contact between each rod and the plates to a simple straight line, thereby allowing the electrolyte ample free passage in the region of 99% of the total surface of the plates and separators.

Figure 4:
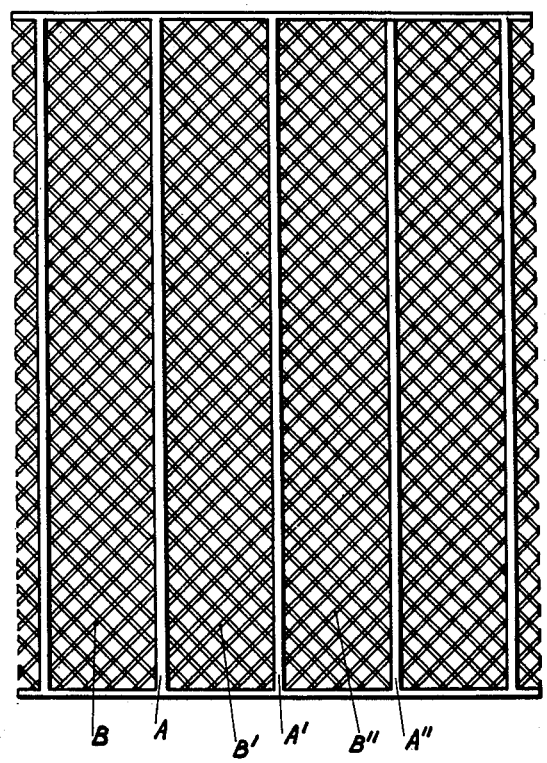
Figs. 4 and 5 are respectively fragmentary side and plan views showing a modified form of separator.
Figure 5:
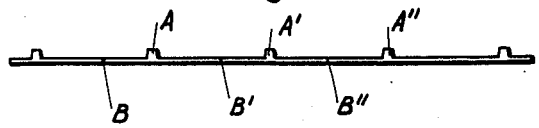

It will be noted in Figs. 4 to 9 the ribs A, $A_1$, $A_2$, etc., and the strips B, $B_1$, $B_2$, etc. extending at 45° from the ribs and defining by their intersection a network of perforations in the form of squares with border triangles.

The injection of plastic into the moulds of these separators is effected without any difficulty, the thin rods, or the strips, being parallel to the direction of the injection.

It is evident that the dimension of the separator may be varied at the will of the manufacturer in accordance with the models of accumulators to be equipped.

We claim:

1. A separator for an electric accumulator comprising a rectangular frame, a number of spaced parallel rods of solid cross-section extending across said frame to define a plurality of rectangular openings, the rods being unitary with the frame, and the rods and frame being moulded of synthetic plastic material, and a pair of opposed flanges projecting from opposite edges of the frame outwards beyond the plane containing the outermost surfaces of the rods so as to enclose the edges of an adjacent accumulator plate and prevent short-circuiting.

2. A separator for an electric accumulator comprising a rectangular frame, a number of spaced parallel rods of solid cross-section extending across said frame to define a plurality of rectangular openings, the rods being unitary with the frame, and the rods and frame being moulded of synthetic plastic material, and a pair of opposed flanges projecting from opposite edges of the frame outwards beyond the plane containing the outermost surfaces of the rods so as to enclose the edges of an adjacent accumulator plate and prevent short-circuiting, the sides of said rods projecting at opposite sides of the frame beyond the planes containing the outermost frame faces, so that said rods engage the accumulator plates at opposite sides of the frame and maintain said plates clear of the frame.

3. A separator for an electric accumulator comprising a rectangular frame and two series of spaced parallel rods of solid cross-section extending diagonally across the frame, each series being at right angles to the other series to define a network of rectangular openings, the rods of the two series being unitary with each other at their intersections and being unitary with the frame, and the rods and frame being moulded of synthetic plastic material, and a pair of opposed flanges projecting from opposite edges of the frame outwards beyond the plane containing the outermost surfaces of the rods so as to enclose the edges of an adjacent accumulator plate and prevent short-circuiting.

4. A separator for an electric accumulator comprising a rectangular frame and two series of spaced parallel rods of solid cross-section extending diagonally across the frame, each series being at right angles to the other series to define a network of rectangular openings, the rods of the two series being unitary with each other at their intersections and being unitary with the frame, and the rods and frame being moulded of synthetic plastic material, and a pair of opposed flanges projecting from opposite edges of the frame outwards beyond the plane containing the outermost surfaces of the rods so as to enclose the edges of an adjacent accumulator plate and prevent short-circuiting, the sides of said rods projecting at opposite sides of the frame beyond the planes containing the outermost frame faces, so that said rods engage the accumulator plates at opposite sides of the frame and maintain said plates clear of the frame.

ROBERT BIDARD.
GEORGES PRÉMILLIEU.

REFERENCES CITED

The following references are of record in the file of this patent:

UNITED STATES PATENTS

| Number | Name | Date |
|---|---|---|
| 631,810 | Osburn | Aug. 29, 1899 |
| 636,142 | Hodgson | Oct. 31, 1899 |
| 705,630 | Alexander-Katz | July 29, 1902 |
| 1,368,093 | Allen | Feb. 8, 1921 |
| 1,569,625 | Gaven et al. | Jan. 12, 1926 |
| 2,338,735 | Person | Jan. 11, 1944 |
| 2,465,493 | Strickhouser et al. | Mar. 29, 1949 |

FOREIGN PATENTS

| Number | Country | Date |
|---|---|---|
| 10,207 | Great Britain | July 16, 1884 |
| 21,562 | Great Britain | Oct. 28, 1899 |
| 29,512 | Austria | Feb. 1, 1907 |
| 507,117 | Great Britain | June 9, 1939 |